United States Patent [19]

Graham

[11] 4,154,331
[45] May 15, 1979

[54] CONTAINER INDEXING METHOD AND APPARATUS

[75] Inventor: Robert H. Graham, Spokane, Wash.

[73] Assignee: R. A. Pearson Co., Spokane, Wash.

[21] Appl. No.: 837,008

[22] Filed: Sep. 27, 1977

[51] Int. Cl.² ............................................. B65G 47/26
[52] U.S. Cl. ..................... 198/434; 53/157; 198/425; 198/459
[58] Field of Search ............... 198/425, 434, 458, 459, 198/461; 53/157

[56] References Cited

U.S. PATENT DOCUMENTS

| | | | |
|---|---|---|---|
| 2,755,611 | 7/1956 | McGihon | 198/459 |
| 3,190,434 | 6/1965 | Dardaine | 198/425 |
| 3,333,676 | 8/1967 | Sherman | 198/425 |
| 3,718,246 | 2/1973 | Dardaine et al. | 198/461 |
| 3,719,018 | 3/1973 | Focke et al. | 53/157 |
| 3,872,647 | 3/1975 | Langen et al. | 198/425 |

Primary Examiner—Robert B. Reeves
Assistant Examiner—Jeffrey V. Nase
Attorney, Agent, or Firm—Wells, St. John & Roberts

[57] ABSTRACT

An apparatus for indexing groups of identical containers into patterns in which the component containers are spaced from one another for the purpose of receiving container separating partitions. The containers include bottom edges that define open spaces when the containers are held in a closed group with adjacent containers touching one another. Tapered lugs of the apparatus are urged inwardly between the containers to separate and index them into partition receiving patterns. This is accomplished by longitudinal conveyor assemblies as the partitions are moved to a partition receiving station. The containers are held in the partition receiving pattern by the tapered lugs which remain in position between the containers until after a partition is placed between the containers of the pattern. The tapered lugs are slotted to receive portions of the partitions.

7 Claims, 4 Drawing Figures

U.S. Patent
May 15, 1979
4,154,331
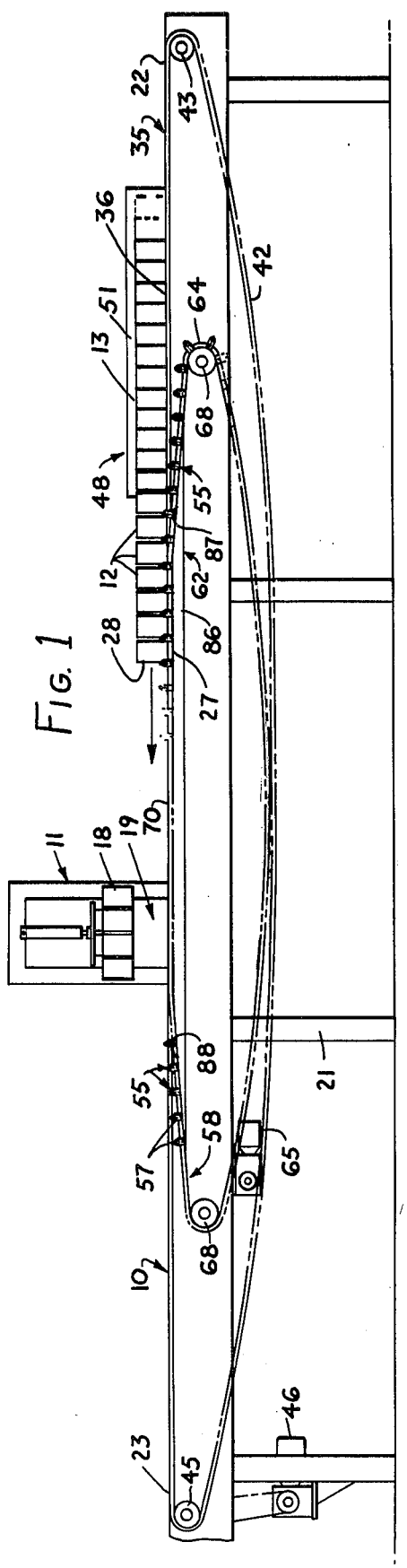
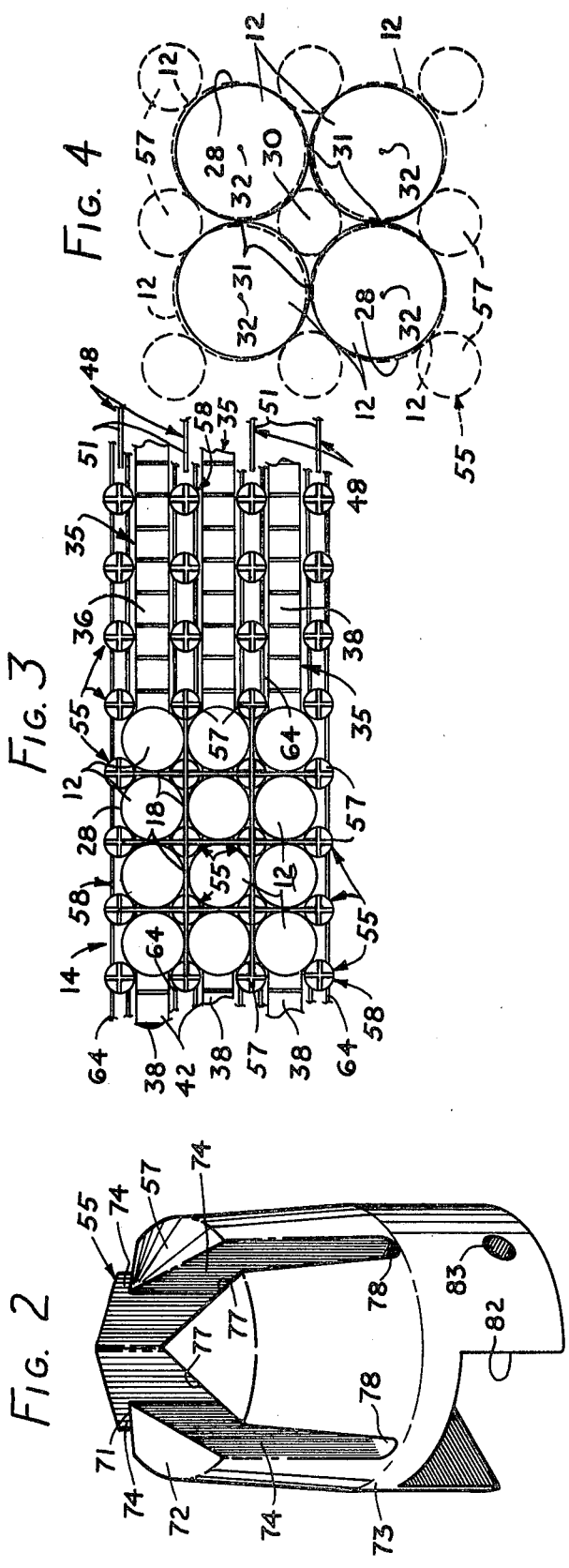

CONTAINER INDEXING METHOD AND APPARATUS

BACKGROUND OF THE INVENTION

This invention relates to the container packing industry and more particularly to the spacing of container groups for the purpose of receiving protective partitions prior to being packed into boxes.

It is common practice to separate individual containers within boxes by interposed partitions. The partitions protect the containers against damage during shipping and handling. The containers in question are generally cylindrical glass objects, such as jars or bottles. Typically, the partition utilized is formed of interconnected pieces of cardboard that form compartments equal to the number of containers.

There is not much difficulty in placing partitions over groups of containers that have upwardly tapered necks such as beer or soft drink bottles. The containers substantially self center themselves within the individual compartments of the partition as it is lowered into place. However, with substantially cylindrical containers such as jars having flat top portions, it is desirable to find some apparatus and method by which the containers may be separated prior to the reception of a partition. If the containers are not adequately spaced, the result is that the partition being forced downwardly against the containers will often overturn the out-of-place containers and damage them. Another result is that an incomplete group of containers may be packed in the box, due to misplaced containers.

The present apparatus solves the above problems by automatically separating groups of containers into prescribed partition receiving patterns prior to the placing of the partitions over selected patterns of containers. In doing so, the containers are precisely separated to enable exact positioning of the partition on the group regardless of whether the containers have tapered top ends or are simply cylindrical objects such as jars or cans.

An indexing apparatus is described for preparing groups of identical containers to receive partitions. This is done by separating adjacent containers and forming the container groups into selected partition receiving patterns. It is necessary that the containers have substantially flat bottom surfaces and that their shape is such that when adjacent containers are touching, open spaces are formed at the plane of the bottom surfaces. The apparatus includes a first conveyor means having a working flight for receiving and supporting the groups of containers and for moving the groups of containers in a forward path of travel. Guide means is located on the first conveyor means for arranging the conveyors into longitudinal files as they move along the forward path. Tapered lug means are located in the forward path of the containers for insertion into the open spaces to engage and separate the adjacent containers, thereby forming them into the selected partition receiving patterns. A lift means is associated with the tapered lug means for inserting the lug means into the open spaces and urging the lug means upwardly to separate the containers into the prescribed partition receiving patterns.

Each lug includes a reduced upper end of a transverse cross-sectional dimension that is less than the usual open space between the lower surfaces of adjacent containers. Each lug also includes an enlarged lower end of greater dimension than the open space. Tapering side surfaces connect the enlarged and reduced ends. It is these side surfaces that engage and force the containers apart as the lugs are lifted. There is at least one open partition receiving slot formed within each tapered lug. The slot extends from an open slot end at the reduced upper end of the lug to a closed lower end adjacent the enlarged lower end of the lug. The partition receiving slot is designed to receive a portion of a partition placed between the containers.

One object of the present invention is to provide an apparatus for effectively indexing successive groups of containers into partition receiving patterns to simplify the placement of partitions.

Another object is to provide such a device that will operate to separate successive groups of containers into partition receiving patterns without substantially interrupting the flow of containers toward a carton or box packing assembly.

These and still further objects and advantages will become apparent from the detailed description of a preferred embodiment. It should be noted that the following description and accompanying drawings merely set forth an example of the preferred form of the invention, and that other forms may be devised.

BRIEF DESCRIPTION OF THE DRAWINGS

FIG. 1 is a simplified elevational view of the present apparatus shown in association with a partition inserting device;

FIG. 2 is a pictorial view of a single tapered lug of my invention;

FIG. 3 is an enlarged fragmentary plan view of the apparatus; and

FIG. 4 is a shematic view illustrating separation of the containers.

DETAILED DESCRIPTION OF A PREFERRED EMBODIMENT

The present indexing apparatus is designated in the drawing by the reference character 10 and is best shown with reference to FIG. 1. The particular lug configuration is illustrated by FIG. 2 and the process by which the containers are separated is best viewed in FIG. 4.

The indexing apparatus of FIG. 1 is utilized in association with a partition insertion apparatus 11. The purpose of the present invention is to group and index a plurality of individual containers 12 from random groups 13 into partition receiving patterns 14 (FIG. 3). The individual containers 12 of the groups are separated into the pattern 14 for the purpose of receiving a container separating partition 18 as shown in FIGS. 1 and 3. This is accomplished at a partition receiving station 19 along the framework of the indexing apparatus 10.

The indexing apparatus 10 and partition insertion apparatus 11 are to be utilized in conjunction with an end-locking case or carton packing machine (not illustrated). An example of an apparatus for end-loading cartons is disclosed in U.S. Pat. No. 3,513,623 granted May 26, 1970 to R. A. Pearson. Portions of that patent relative to apparatus and processes for loading cartons with containers is hereby incorporated into this application by reference. In addition, specific details of a partition inserter are disclosed in U.S. Pat. No. 3,803,993 granted on Apr. 16, 1974 to Robert H. Graham. Specific details concerning the formation and placement of successive partitions over containers prior to the packing of the grouped containers into a carton as disclosed in that patent are hereby incorporated into this application by reference.

Specifically, the present invention is concerned with preparing groups of containers 12 for receiving partitions prior to end-loading of the containers 12 into cartons or boxes (not shown). The indexing apparatus includes a supportive framework 21 upon which the present apparatus operates to move containers 12 in a forward path from an input or intake end 22 to an outlet end 23. The case or carton packing apparatus (not shown) would be located at the output end 23 and an appropriate container feeding device (not shown) would be located at the intake end 22.

The containers 12 are shown diagrammatically in FIGS. 1, 3 and 4. They include substantially flat bottom ends 27 and at least the lower portion of each is cylindrical in configuration. Their identical exterior side surfaces 28 come into contact with adjacent containers 12 when the random groups are urged along the forward path. The common shapes of surfaces 28 are such that open spaces 30 (FIG. 4) are formed between touching containers. Since the containers are identical in configuration, these spaces are uniform so long as the containers remain in transverse alignment.

As shown in FIG. 4, the containers 12 touch one another at tangential points 31 and the surfaces of the containers between these points define boundaries of open spaces 30. It should be noted that it is required only that the open spaces 30 be formed at the bottom surfaces 27 of the containers. The open spaces may close toward the top of containers 12 without substantially affecting the function of the present invention. For the purpose of later discussion, each container 12 includes a center upright axis 32. The center axes 32 of containers 12 are spaced apart a first distance when the containers are crowded together and engage one another in random groups. Before partition insertion they are spaced apart a second distance prescribed by the tapered lugs described below.

Containers 12 are received on a first conveyor means 35 and are moved on a working flight 36 in a horizontal plane. They proceed along a forward path indicated by arrow 37 in FIG. 1. First conveyor means 35 is comprised of several parallel endless chain conveyors that define a flat support surface 38 along working flight 36. This flat support surface 38 is made up of a plurality of plates that are attached to the lengths of the several chain conveyors. The flat support surface is designed to slide beneath the containers 12 when their forward motion is temporarily stopped. This crowds them into a closed relationship whereby adjacent containers engage one another.

The endless chains of first conveyor means 35 are indicated at 42 in FIG. 1. They are trained about several common sprockets 43 at the intake end 22 and a like number of drive sprockets 45 at the outlet end 23. The chains 42 are continuously driven by a motor 46 and a conventional drive arrangement associated therewith. Thus, as shown in FIG. 1, the working flight 36 extends along the horizontal plane from the intake or input end 22 past the partition receiving station 19 and terminates at an infeed end (not shown) of the appropriate case or carton packing adjacent the outlet end 23.

As the containers 12 are received on the present apparatus 10, they are divided into longitudinal files (FIGS. 1 and 3). A guide means 48 is provided to separate the files of incoming containers 12. First conveyor means 35 continuously operates beneath the containers 12 to move them in the forward direction. Therefore, each container 12 will remain in contact with an adjacent downstream container. The containers 12 will remain in this random grouping until operation of the present indexing assembly.

The guide means 48 is comprised of a number of longitudinal upright plates 51 arranged transversely across the first conveyor means 35 at the intake end 22. The plates 51 are transversely spaced by distances approximating the overall cross-sectional diameter of the identical containers 12. It is not necessary that the plates 51 be of substantial thickness in order to separate the containers any prescribed distance. This function is accomplished completely by the downstream indexing assembly. The purpose of guide means 48 is to transform the random grouping into uniform longitudinal files.

The tapered lug means is illustrated generally at 55, comprised of a plurality of upwardly tapered lugs 57 that are spaced apart on a second conveyor means 58. The conveyor means 58 is arranged to receive and move the containers along the forward path in association with the first conveyor means 35. A lift means 62 is provided to bring the tapered lugs 57 upwardly into contact with the containers located along the working flight 36 of first conveyor means 35. In doing so, the individual containers 12 are engaged by the lugs and spaced apart by distances equal to the spacing of the lugs 57.

The second conveyor means 58 is comprised of a plurality of endless chains 64 that are located intermediate the chains comprising the first conveyor means 35. The chains 64 are driven by a motor 65 through a course defined by longitudinally spaced sprockets 68. These sprockets 68 are located inwardly of the sprockets 43, 45 that define the working flight 36 for the first conveyor means 35. A working flight 70 is located between sprockets 68 along a horizontal plane that is parallel to the plane of the working flight 36. The chains of the two conveyor means 35 and 58 are alternated across the width of the pattern as seen in FIG. 3.

A single tapered lug 57 is illustrated in detail by FIG. 2. Several such lugs are illustrated in FIGS. 1 and 3. Each lug 57 includes an upper reduced end 71. The cross-sectional dimension of this end is somewhat smaller than the same cross-sectional dimension of the opening or open space 30 between the adjacent containers when they are touching in the random groups (FIG. 4, solid lines). Tapered sides 72 diverge downwardly from the upper reduced end to an enlarged lower end 73. The cross-sectional dimension of the enlarged lower end 73 is somewhat larger than the same cross-sectional dimension of the open space 30 between adjacent touching containers.

Lugs 57 each include a cruciform slot 74. Each slot 74 extends from an open upper end 77 that is adjacent the reduced upper end 71 and terminates at a closed lower end 78 adjacent the enlarged lower end 73 of the lug. The slots 74 are cruciform in cross section as may be seen in FIG. 3. They are designed to receive the intersecting portions of a partition 18 when placed on the indexed containers. Thus, half of the cruciform shaped slot will be aligned longitudinally with the longitudinal container files while the remaining half will be perpendicular. The centers of the cruciform slots are located to receive the junctions of perpendicular sides of the partitions as shown in FIG. 3. The depth of the slots allows the partition to be lowered to the level of the first conveyor working flight 36 and thus to the level of the flat container bottoms 27.

Each tapered lug 57 is mounted to an endless chain 64 of the second conveyor means 58. The appropriate chain is received within a chain receiving recess 82 of the lug. Link pin receiving apertures 83 are formed transversely through the individual lugs to receive fastening link pins that are also utilized for connecting adjacent links of the chain. Thus, the independent lugs will pivot with the chain links as illustrated in FIG. 1 while moving about the course defined by sprockets 68. The lugs are equally spaced on their respective chains 64 and are in alignment transversely to define transverse rows of lugs and containers engaged thereby.

Both longitudinal and transverse spacing between adjacent lugs 57 is exactly equal to the desired spacing between containers when they are located in the partition receiving pattern. In other words, the spacing between centers of the lugs 57 is slightly greater than the thickness of a partition wall plus the distance between the centers 32 of touching containers. The cross-sectional dimension of the lugs is determined by the cross-sectional dimension of the open spaces 30 into which they are to be inserted. If the containers are cylindrical, the maximum diameter of the tapered lugs 57 is related to the diameters of the containers plus an additional amount to assure the desired spacing between containers when they are indexed into the partition receiving patterns.

The lift means 62 is illustrated in FIG. 1. It is simply comprised of guide rods 86 that are upwardly inclined at 87 in the path of the second conveyor means 58. The guide rods 86 engage the several endless chains 64 and elevate them to the approximate location of the working flight 36 for the first conveyor means 35. The gradual inclination of the guide rods 86 serves to lift the tapered lugs 57 into engagement between or within the open spaces 30 between touching containers. As the lugs are moved upwardly, the tapered side lug surfaces 72 come into contact with the adjacent containers to engage the containers and slide them over the flat surface 38.

When the lugs are fully elevated, full contact is made between the containers and the tapered lugs 57 and the resulting partition receiving pattern 14 is arrived at. Similarly, the downstream ends of the guide rods 87 are inclined downwardly at 88 to lower the tapered lugs 57 from engagement with the groups of containers. However, at this point, the containers have already received a partition 18 that will hold the containers in the desired partition receiving pattern.

The method utilized to separate or index random groups of containers into the specified partition receiving patterns is accomplished first by moving random groups of containers along a forward path on the first conveyor means 35. While the containers are moving forwardly on conveyor means 35, they are guided into longitudinal files 47 by guide means 48. The first conveyor means 35 is operated to continuously urge the containers in the forward path so they will come into abutment with the lugs 57 that have been positioned by the guide rods 86 in the path of the forwardly moving containers. Thus, the first transverse row of containers will come into contact with an associated transverse row of lugs 57. Contact with the tapered lugs 57 halts further forward movement of the remaining containers. Thus, they will conform to the transverse alignment of the lugs and will remain in contact, forming the open spaces 30.

As the second conveyor means 58 is operated to move its working flight along the forward direction, the lugs 57 are also moved in that direction so that the next successive row of lugs will come into contact with the spaces behind the already engaged row of containers. As the lugs move upwardly, (due to the lift means 62) their tapered sides engage the outer surfaces 28 of the containers and force them to separate the prescribed distances. This process continues with each transverse row of containers received by the second conveyor means and engaged by the successive rows and files of tapered lugs 57.

When a sufficient number of containers have been received to form the desired pattern (for example 12 as shown in FIG. 3), the lugs 57 have attained a full elevational position and have thus completed the indexing of the engaged containers to the partition receiving pattern. Therefore, at any point downstream of this position, the partition may be placed between the containers of the group and left in position thereon.

The tapered lugs 57 will become disengaged from the successive containers as they move downwardly and recede along the inclined ends 88 of guide rods 87. This leaves the partition in position separating the desired pattern of containers for further handling as a safely partitioned group of containers ready for packing in cartons or cases.

The second conveyor means may be operated intermittently by conventional control means to move in successive groups of partitions that have been arranged in the partition receiving pattern past the partition insertion apparatus. The second conveyor means 58 could alternatively be operated continuously to move the containers along the forward path and the partition could be moved longitudinally and deposited in place over the containers as they move along. If the latter function is performed, it would be desirable to operate the working flight of the first conveyor means 35 at a slightly higher speed. This would produce the effect of crowding the containers against the lugs emerging on the guide rods 87 and thereby maintain contact between the successive adjacent containers until the desired spacing is achieved solely by operation of the upwardly moving tapered lugs 57.

It is again emphasized that the above description and the attached drawings are given merely as an example of a preferred form of my invention and that other forms may be devised therefrom. It is therefore the purpose only of the following claims to define the scope of my invention.

What I claim is:

1. An indexing apparatus for preparing groups of identical containers to receive partitions by separating adjacent containers and forming the groups into selected partition receiving patterns, said containers having substantailly flat bottom surfaces and side walls such that when the containers engage one another, open spaces are formed between the containers at the plane of the bottom surfaces, wherein the indexing apparatus comprises:

first conveyor means for receiving and supporting groups of containers and for moving the groups of containers in a path of travel toward a partition receiving station;

guide means on the first conveyor means for arranging the containers into longitudinal files as they move along said path;

tapered lug means in the path of the containers for insertion into the open spaces to engage and separate the containers to form a selected partition receiving pattern; and means operatively associated with the tapered lug means for inserting the lug means into the open spaces between the containers;

said tapered lug means including upwardly open slots adapted to receive a partition while the containers are in said selected partition receiving pattern.

2. The apparatus as defined by claim 1 wherein the tapered lug means is comprised of a plurality of upwardly tapered lugs spaced apart by distances equal to the spacing between centers of containers when in the partition receiving pattern and wherein each tapered lug includes:

an upper reduced end of less horizontal dimension than the open spaces between adjacent touching containers;

an enlarged lower end of greater horizontal dimension than the open spaces between adjacent touching containers;

tapering side surfaces connecting the enlarged and reduced ends;

wherein the tapering side surfaces engage and separate adjacent containers to form the selected partition receiving patterns;

said upwardly open slots being cruciform in cross section.

3. The apparatus as defined by claim 1 wherein the tapered lug means is comprised of a plurality of upwardly tapered lugs spaced apart by distances equal to the spacing between centers of containers when in the partition receiving pattern and wherein each tapered lug includes:

an upper reduced end of less horizontal dimension than the open spaces between adjacent touching containers;

and enlarged lower end of greater horizontal dimension than the open spaces between adjacent touching containers;

tapering side surfaces connecting the enlarged and reduced ends;

wherein the tapering side surfaces engage and separate adjacent containers to form the selected partition receiving patterns.

4. The apparatus as defined by claim 1 further comprising:

a partition receiving station;

second conveyor means for receiving containers from the first conveyor means and moving the containers received thereby toward the partition receiving station;

said tapered lug means being operatively associated with the second conveyor means to separate the containers into said selected partition receiving pattern as the containers are moved to the partition receiving station;

said tapered lug means being comprised of a plurality of upwardly tapered lugs mounted along the second conveyor means and spaced apart thereon by distances equal to the desired spacing between centers of the containers when in said partition receiving pattern.

5. A tapered lug for indexing containers into a partition receiving pattern for a partition inserting apparatus of the type used to place a partition between adjacent containers of a group, the containers being identical and shaped such that open spaces are formed between containers that are in engagement with one another, the tapered lug comprising:

a reduced upper end of transverse cross-sectional dimension less than the open spaces;

an enlarged lower end of greater dimension than the open spaces;

tapering side surfaces connecting the enlarged and reduced ends; and an open partition receiving slot formed within the tapered lug extending from an open slot end at the reduced upper end to a closed lower end adjacent the enlarged lower end of the lug.

6. The tapered lug as defined by claim 5 wherein the lug is adapted to be mounted to an endless chain conveyor.

7. The tapered lug as defined by claim 5 wherein the open partition receiving slot is cruciform in cross section.

* * * * *